April 11, 1950

C. S. NOBLE ET AL 2,503,884

BLADE WEEDING ASSEMBLY

Filed April 23, 1947

Inventors:
Charles C. Noble.
Shirley F. Noble.
Gerald C. Noble.

By: Tuterstonlough & Co
their Atty's.

Patented Apr. 11, 1950

2,503,884

UNITED STATES PATENT OFFICE 2,503,884

BLADE WEEDING ASSEMBLY

Charles S. Noble, Gerald C. Noble, and Shirley F. Noble, Nobleford, Alberta, Canada Application April 23, 1947, Serial No. 743,293

6 Claims. (Cl. 97—207)

Our invention relates to improvements in weeding assemblies, an object being to provide an assembly of the character herewithin described designed for attachment to the lower ends of standards such as those shown in the United States Patents Nos. 2,323,412 and 2,345,702 of July 6, 1943, and April 4, 1944, respectively issued to Charles S. Noble. In these two patents there is illustrated the superstructure whereby our present assemblies may be drawn through the ground after the firm soil has first been loosened up either with one of the straight, transversely extending blades illustrated in the above identified patents, or preferably by a blade such as is illustrated in the Charles S. Noble United States Patent No. 2,373,703 of April 17, 1945, either attached to one or other of the straight, elongated and transversely extending carriers shown in the above patents, or to a V-shaped carrier such as those shown paired in Figure 7 of the Charles S. Noble United States Patent application Serial No. 588,597, filed on April 16, 1945.

The embodiments of weeding assembly herein described and illustrated have been particularly designed, and are conspicuously effective in the destruction of weeds which have grown after a piece of ground has been processed by an initial stroke, as for example immediately after harvesting, by which stroke the land has been opened up for subsequent strokes by the weeding assembly herein described. The action performed by the herein described assemblies is more in the nature of a scraping a crumbling one in a "topsoil" layer previously cut by one of the Noble blades aforesaid, and the object of these weeding assemblies is to apply considerable pressure against soil around weed roots due to the steepness of pitch of the weeding element, thereby breaking and crumbling the soil of said weed roots which results in a more nearly complete extermination of weeds than is the case by the use of the Noble blades alone.

An important characteristic of the weeding assemblies herein described is that of strong ground suction immediately behind the steeply inclined cultivating elements as the assembly is drawn through the soil. Due to such suction the weeding element can work at extremely shallow depths and with a minimum of skipping. Shallow processing without skipping is of prime importance for maximum weed destruction according to our experience.

A further object of the present invention is to provide means for exterminating weeds which are attachable interchangeably to the superstructure of the patents above referred to, which are conspicuously simple and accordingly inexpensive, which are easy to operate without experience, and which involve no independently moving parts.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings, in which—

In the drawings like characters of reference indicate corresponding parts in the different figures.

Figure 1:
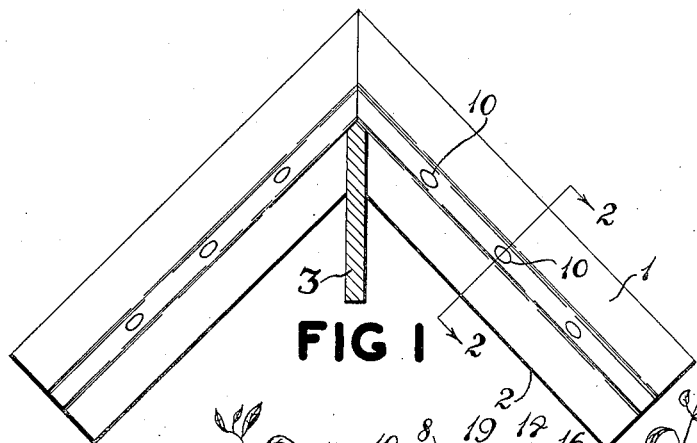
Figure 1 is a diagrammatic plan representation of one of our weeding assemblies with a supporting standard as per one of the above identified patents shown in section.
Figure 2:
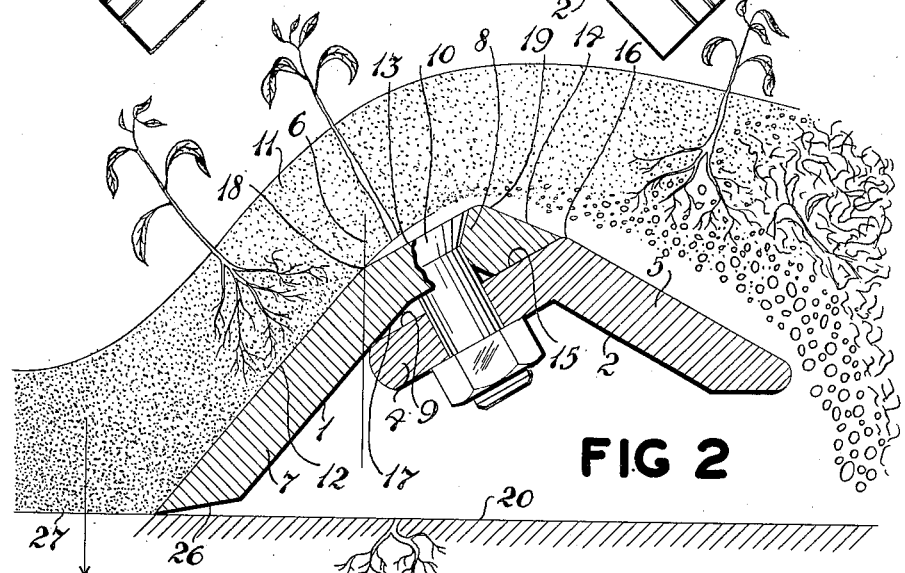
Figure 2 is a cross-section on the line 2—2 of Figure 1.

Describing first the embodiment of our invention per the accompanying Figures 1 and 2, the same will be seen to comprise two principal parts, viz., an elongated weeding element collectively designated 1, and an elongated carrier therefor collectively designated 2, and it is to be understood that the assembly may be V-shaped as per Figure 1, or straight and extending normal to the direction of travel of the superstructure, or diagonal to such direction, the former being illustrated in the first two above enumerated patents.

In any event the carrier will be secured to the lower end of a standard 3 or a pair of standards as in the aforesaid patents, the carrier being of shallow, inverted V-shape and so capable of being considered when viewed in cross-section as embodying a forwardly and downwardly inclining leading side 4, and a rearwardly and downwardly inclining trailing side 5, the trailing side 5 being of more massive cross-section and of greater length than the leading side 4.

For purposes of description and definition our weeding element 1 may also be considered as longitudinally bisected on the line 6 into leading and trailing sides 7 and 8 respectively. The element is secured overlappingly against the upper leading surface 9 of carrier 2, while the leading side 7 projects in advance of the leading side of the carrier forwardly and downwardly. The element 1 is secured to carrier 2 by means of the nut and bolt assemblies 10 at intervals upon the length thereof.

To achieve the desired crushing effect of the topsoil-layer 11 the leading portion 12 of the upper surface of our weeding element 1 is inclined more steeply than the surface portion 9, and to the rear of the surface portion 12 is an intermediate upper surface portion 13 substantially parallel with the said surface portion 9. To the rear of the portion 13 is a trailing upper surface portion 14 which inclines rearwardly and downwardly, the trailing edge 15 of our cultivating element abutting the upper surface portion 9 adjacent the apex 16 of the carrier. The undersurface portion 17 of the trailing side of our cultivating element is seen to be spaced from the surface 9, and by this configuration of structure, it will be recognized that the element may be very securely bolted to the carrier since a certain flexure as between the carrier leading side and the element trailing side is attained when the nuts on the assemblies 10 are tightened.

In virtue of the upper surface portions, 13 and 14, of the cultivating element 1, it will be apparent that we have achieved means whereby the necessary steep, crushing lift of the topsoil-layer 11 is attained, in combination however with the earliest practicable release thereof along the ridge 18. The provision of the trailing ridge 19 and associated counter-inclination of the surface portion 14 also allows for the gradual subsident of the topsoil-layer 11 as our assembly moves through the ground, with a minimum of contact and resultant frictional drag. With such an assembly as the foregoing, it will be understood that the topsoil-layer disintegrates as it subsides back onto the plane 20 therebelow instead of being preserved substantially intact as is the case with the blade and carrier assembly of the Noble United States Patent No. 2,373,703. Hence the earth around weed roots is crumbled and broken away from such roots, which will thereafter lie on the surface to dry out while others will be buried with the weed plants, in either event to be very largely exterminated.

Figure 3:
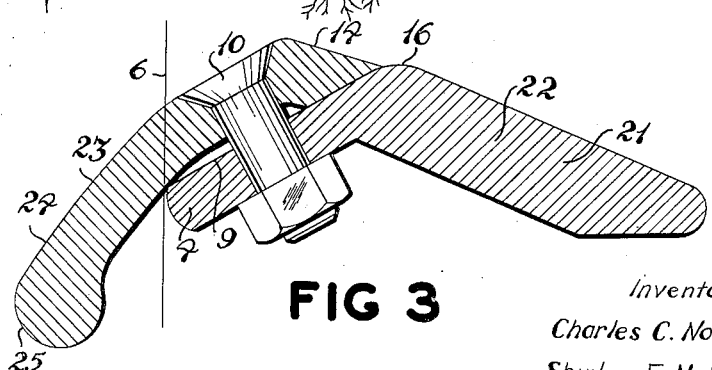
Figure 3 is a section similar to that of Figure 2 but illustrating a weeding element having a rolled leading edge.

In the accompanying Figure 3 is illustrated a carrier 21 similar in all respects to carrier 2 except that the trailing side 22 thereof in this embodiment is more massive than is the case with the embodiment of Figure 2 to provide added stiffness against bowing. The element 23 is also similar to weeding element 1 excepting that a slight convexity is provided upon the upper leading surface portion 24, and the provision of a rolled leading edge 25 in contrast to the bevelled leading edge 26 of Figure 2.

The weeding element of Figure 3 is also employed in subsequent strokes following the initial strokes by a comparatively shallow-pitched blade such as that of Noble Patent No. 2,373,703, the trail of which we have indicated at 27 in Figure 2. The embodiment of Figure 3 however is designed for use primarily in very loose, sandy soil. This type of soil offers insufficient resistance to the blade edge 26 of Figure 2 to make a clean cut of weeds, which would accordingly catch and foul the blade edge 26 if used in very loose, sandy soil. However, the rolled edge 25 when employed in association with a V-shaped carrier (or with a straight carrier positioned diagonally with respect to the direction of travel) allows weeds to slip off much more easily in loose, sandy soil, and when it does not cut or break them off at the roots, it will drag them under, cover them and macerate them to effect a very efficient kill.

Since many modifications can be made in the invention herein described, and since the accompanying drawings have been prepared only to illustrate the relative arrangement and interaction of parts, and not with regard to accuracy of dimensions for manufacturing purposes which in view of this disclosure we consider to entail merely mechanical skill together with the skill of the mechanical draftsman, and since many apparently widely different embodiments of this invention may be made within the spirit and scope of the accompanying claims without departing from the spirit and scope thereof, it is intended that all matter contained in the accompanying specifications shall be interpreted as illustrative only and not in a limiting sense, and we accordingly desire only such limitations placed thereon as justice dictates.

What we claim as our invention is:

1. A weeding assembly for attachment to a mobile superstructure, said assembly comprising the combination of an elongated weeding element and an elongated carrier therefor, said carrier when viewed in cross-section being seen to be of downturned V-shape, and embodying a leading side and a trailing side on either side of the apex of said V respectively, said element being attached to the leading side of said carrier and projecting in advance of the leading edge thereof, said element also embodying a leading and a trailing side, said leading side being that which projects as aforesaid, said trailing side being that by which said element is attached as aforesaid, the upper surface of the leading side of said element and carrier being planar, with the upper surface of the leading side of said element more steeply inclined from the horizontal than the upper surface of the leading side of said carrier.

2. A weeding assembly for attachment to a mobile superstructure, said assembly comprising the combination of an elongated weeding element and an elongated weeding carrier for supporting the same, said carrier when viewed in cross-section being seen to have a downwardly arched upper surface embodying a leading surface portion inclining forwardly and downwardly, and a trailing surface portion inclining rearwardly and downwardly, said weeding element being secured overlappingly against said leading surface portion and when viewed in cross-section being seen to embody leading and trailing sides, said carrier being secured to said superstructure via said trailing surface portion, said leading side projecting in advance of said carrier and inclining forwardly and downwardly at a steeper angle of inclination than the said leading surface portion of said carrier, the trailing side of said element having an intermediate upper surface portion substantially parallel with the leading upper surface portion of said carrier, and a trailing upper surface portion inclining rearwardly and downwardly, the trailing edge of said element abutting the upper surface of said carrier.

3. The device according to claim 2 in which the trailing edge of said weeding element abuts the said leading surface portion of said carrier.

4. In a weeding assembly for attachment to a mobile superstructure, an elongated carrier, said carrier when viewed in cross-section being seen to be of down-turned V-shape and embodying a leading side and a trailing side on either side of the apex of said V respectively, an elongated weeding element being attachable overlappingly to said leading side, said trailing side of greater thickness than said leading side, said weeding element when viewed in cross-section being seen to embody a leading side and a trailing side, said weeding element being fastened to the leading side of said carrier via said trailing side, said leading side of said weeding element projecting in advance of the leading side of said carrier, the advancing side of said element when attached to said carrier inclining forwardly and downwardly at a steeper angle of inclination than the leading side of said carrier, said element trailing side being angulated with respect to said leading side, the leading edge of the leading side of said weeding element being rolled as and for the purpose specified.

5. In a weeding assembly for attachment to a mobile superstructure, an elongated carrier, said carrier when viewed in cross section being seen to be of downturned V-shape and embodying a leading side and a trailing side on either side of the apex of said V respectively, an elongated weeding element being attachable overlappingly to said leading side, said trailing side being of greater thickness than said leading side, said weeding element when viewed in cross-section being seen to embody a leading side and a trailing side, said weeding element being fastened to the leading side of said carrier via said trailing side, said leading side projecting in advance of the leading side of said carrier, the advancing side of said element when attached to said carrier inclining forwardly and downwardly at a steeper angle of inclination than the leading side of said carrier, said element trailing side being angulated with respect to said leading side, the leading edge of the leading side of said element being rolled as and for the purpose specified.

6. In a weeding assembly for attachment to a mobile superstructure, an elongated carrier, said carrier when viewed in cross section being seen to be of downturned V-shape and embodying a leading side and a trailing side on either side of the apex of said V respectively, an elongated weeding element being attachable overlappingly to said leading side, said trailing side being of greater thickness than said leading side, said weeding element, when viewed in cross-section, being considered as being divided into leading side and a trailing side, said element being attached overlappingly to the leading side of said carrier, the trailing side of said element being considered as that portion which overlaps said carrier leading side, the leading side of said element projecting in advance of said carrier leading side, and inclining forwardly and downwardly therefrom at a steeper angle of inclination, said element trailing side having an upper surface of which the rear portion inclines downwardly towards the trailing edge of said element, said rear edge abutting the leading side of said carrier, the leading edge of said weeding element being rolled as and for the purpose herein specified.

CHARLES S. NOBLE.
GERALD C. NOBLE.
SHIRLEY F. NOBLE.

REFERENCES CITED

The following references are of record in the file of this patent:

UNITED STATES PATENTS

| Number | Name | Date |
|---|---|---|
| 2,323,412 | Noble | July 6, 1943 |